United States Patent [19]

Feldman et al.

[11] 4,239,995
[45] Dec. 16, 1980

[54] METAL VAPOR RAMAN FREQUENCY SHIFTER

[75] Inventors: Donald W. Feldman; Lelland A. Weaver, both of Pittsburgh; Chi-Sheng Liu, Monroeville, all of Pa.

[73] Assignee: Westinghouse Electric Corp., Pittsburgh, Pa.

[21] Appl. No.: 15,845

[22] Filed: Feb. 27, 1979

[51] Int. Cl.² ............................................. H03F 7/00
[52] U.S. Cl. ................................. 307/426; 307/425
[58] Field of Search ............................... 307/425, 426

[56] References Cited

U.S. PATENT DOCUMENTS

| 3,795,819 | 3/1974 | Harris | 307/425 |
| 3,914,618 | 10/1975 | Harris | 307/425 |
| 4,103,179 | 7/1978 | Schmidt | 307/426 |

Primary Examiner—Rudolph V. Rolinec
Assistant Examiner—Darwin R. Hostetter
Attorney, Agent, or Firm—M. P. Lynch

[57] ABSTRACT

Shifted Raman radiation for an all-hot Raman discharge cell is produced by external laser pumping of a metal halide medium in the cell during an afterglow period following dissociation of the metal halide medium into metal atoms and before recombination to form the original species of the metal halide medium.

17 Claims, 3 Drawing Figures

METAL VAPOR RAMAN FREQUENCY SHIFTER

BACKGROUND OF THE INVENTION

Metal vapors have shown great promise as media for stimulated Raman scattering devices. The metal atoms have the advantage of producing large frequency shifts which can employ excimer lasers such as KrF, XeCl and XeF to generate radiation in useful regions of the visible spectrum. A suitably chosen atomic metal vapor species will have energy levels with splittings close to the pump frequency so that the Raman scattering process will be enhanced by resonance effects, thus requiring short optical paths and low vapor densities. For various pump lasers and for various desired emission wavelengths, it is desirable to be able to choose a metal vapor species without restriction, and to produce vapor densities of the order of $10^{16} \rightarrow 10^{17}$ cm$^{-3}$. The conventional technique produces the vapor by simply heating the elemental metal within a hot cell. This method presents several difficulties: (1) For some metals of interest such as tungsten or rhenium, the required temperatures are difficult and expensive to achieve in any container for a long time period. (2) For almost all metals, the temperatures required to produce the necessary vapor densities are inconsistent with the use of all-hot systems. As examples, iron and scandium, two species of interest for producing blue-green emission from KrF, XeCl and XeF lasers, would require temperatures of about 1800° C. and 2000° C. respectively to produce densities of $10^{16}$ cm$^{-3}$. At these temperatures, no windows of acceptable optical quality exist, and therefore a cell would require a central hot zone with cold (room temperature) windows. This results in a diffusion of vapor to the cold region and a limited operating lifetime for the device. The invention described herein permits the production of suitable vapor densities from a wide variety of metals at moderate temperatures which are compatible with conventional glass and metal construction. Thus, long operating lifetimes are realized.

SUMMARY OF THE INVENTION

The disclosed invention employs pulsed electrical discharges and all-hot quartz or Pyrex discharge tubes to generate high densities ($10^{16}$ to $10^{17}$ cm$^{-3}$) of metal atoms in the afterglow of discharges in halide or oxide combinations of the desired metal. During the afterglow period, an external pump laser, such as a KrF, XeCl or XeF laser, irradiates a Raman discharge cell to produce shifted Raman radiation from the dissociated metal species. Mirrors resonant at the Raman-shifted wavelength can be employed to resonate the output emission from the discharge cell.

The advantage of this approach is that high metal vapor densities can be obtained on a transient basis at envelope operating temperatures below approximately 1100° C. where quartz, and even Pyrex, materials can be employed. This permits the use of all-hot, long-lived discharge tube designs similar to those developed for copper halide lasers, and makes available virtually all metal species of interest for Raman scattering applications. This combination of unrestricted metal atom availability at the required high density levels, and a practical, long-lived discharge tube embodiment opens up an entire new area of Raman lasers in the visible spectrum. Using KrF, XeCl and XeF pump lasers, it is possible to generate a wide spectrum of Raman-shifted laser wavelengths throughout the visible and near infrared portions of the spectrum. Such wavelengths have application in laser isotope separation, blue-green lasers for underwater applications, and various military countermeasure applications in the near infrared.

DESCRIPTION OF THE DRAWINGS

The invention will become more readily apparent from the following exemplary description in connection with the accompanying drawings.

DESCRIPTION OF THE PREFERRED EMBODIMENT

Figure 1:
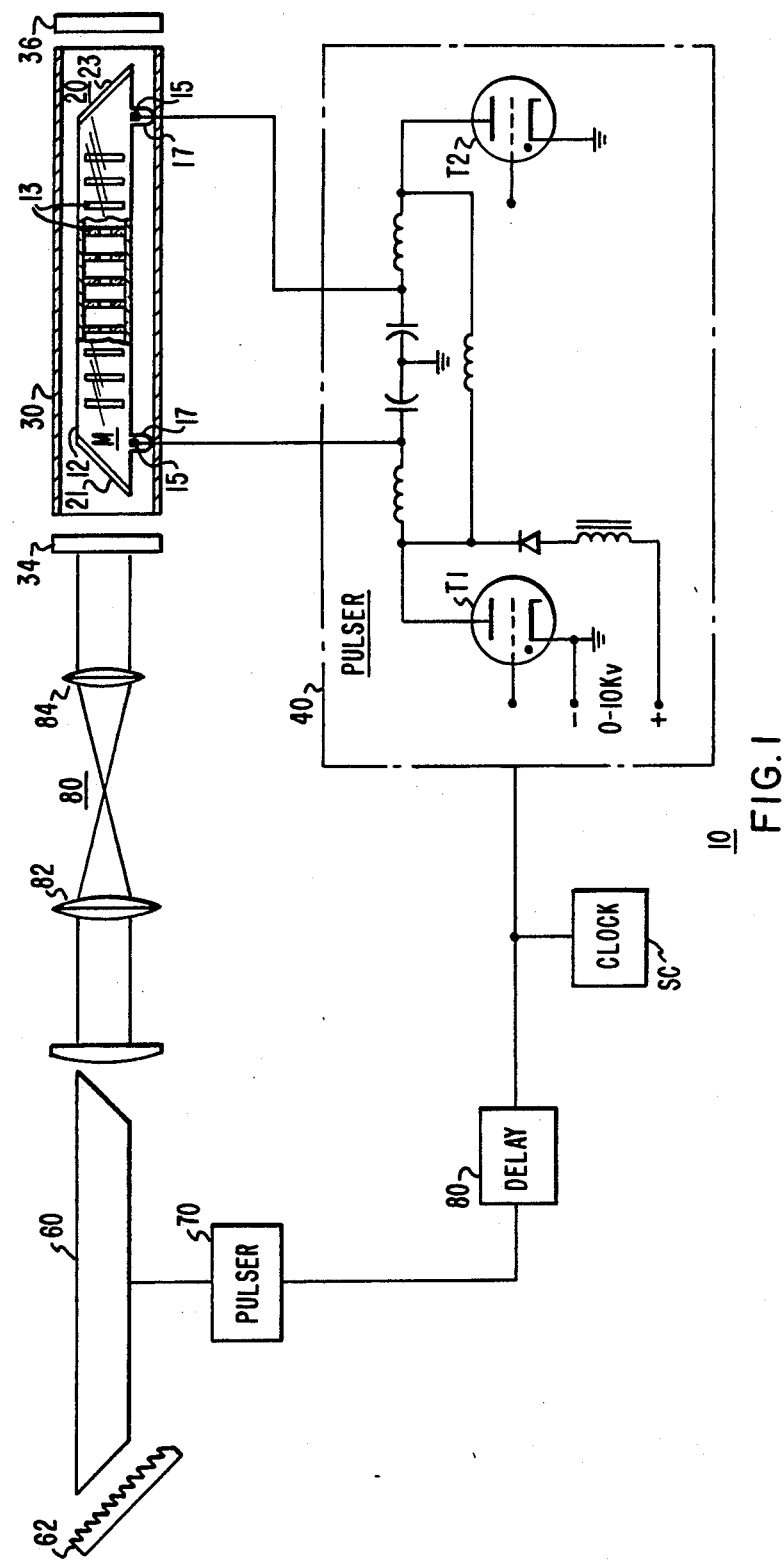
FIG. 1 is a schematic illustration of an embodiment of the invention.

Most Raman-shifting devices use vibration excited states as the final Raman state. This usage results in shifts ranging from approximately 100 cm$^{-1}$ for solids to 4155 cm$^{-1}$ for H$_2$ gas. Recently metal vapors have been employed as Raman scattering media with electronic levels serving as the final state. These media have several important advantages:

1. The matrix element for electronic transitions can be very large compared to those involving vibrational excitations.
2. Metal atoms in the vapor state have very narrow energy levels in the visible and near UV, and near resonance Raman pumping to these levels can be achieved with available laser sources.

This combination of properties leads to very high gain Raman devices.

Another important feature of atomic metal vapor is that the electronic states to which scattering occurs can be high enough in energy to produce large frequency shifts. The largest shift that can be obtained routinely at high efficiency using a molecular vibration is approximately 4155 cm$^{-1}$ from H$_2$, but shifts of approximately 20,000 cm$^{-1}$ are possible with metal atoms. This is of great interest due to the recent developments in rare gas halide excimer lasers. These gas lasers, which are capable of generating high energy pulses at high efficiency, emit in the near UV (approximately 248 nm for KrF, and approximately 351 nm for XeF). Thus, large Raman intervals are required to shift their frequencies into useful parts of the visible spectral region. For example, to produce 480 nm radiation from KrF, XeCl or XeF laser sources requires frequency shifts of approximately 19,500 cm$^{-1}$ and 7,660 cm$^{-1}$, respectively. In general, a Raman interval shifts of this magnitude are required to shift rare gas halides excimer lasers into the blue-green portion of the spectrum where seawater transmission is optimum.

As an example, Table 1 lists a number of atomic vapors that would be useful in shifting KrF, XeCl and XeF laser wavelengths to the blue-green spectral region. In each case, the particular transitions selected are those which possess the highest Raman gain, or have Raman gains sufficiently large that oscillation at the shifted wavelengths can likely be achieved with the aid of external resonators.

TABLE 1

Candidate Metal Vapor Systems for Raman Shifting Pulsed KrF and XeF Lasers into the Blue-Green Spectral Region

| Element | Pump Source Laser | Shifted Wavelength $\lambda_s$(nm) | Metal Temperature $T_m$(°C.) | Metal Halide Temperature $T_H$(°C.) | Halide Species | Figure of Merit ($f_m \times 10^9$) | Raman Gain $g_s$(cm/W) |
|---|---|---|---|---|---|---|---|
| Fe | KrF | 443.5 | 1800 | 418 | $FeI_2$ | $7.8 \times 10^{-2}$ | $1.6 \times 10^{-6}$ |
| Ti | KrF | 443.6 | 2100 | 121 | $TiI_4$ | $6.0 \times 10^{-2}$ | $1.3 \times 10^{-6}$ |
| Fe | KrF | 447.0 | 1800 | 418 | $FeI_2$ | $2.3 \times 10^{-1}$ | $4.8 \times 10^{-6}$ |
| Nb | XeF | 447.3 | 3300 | 113 | $NbI_5$ | $1.8 \times 10^{-3}$ | $3.8 \times 10^{-8}$ |
| Ta | XeF | 449.4 | 3700 | 130 | $TaCl_3$ | $3.2 \times 10^{-5}$ | $6.7 \times 10^{-10}$ |
| Ti | XeF | 454.0 | 2100 | 121 | $TiI_4$ | 3.7 | $7.8 \times 10^{-5}$ |
| Gd | XeF | 455.7 | 2000 | 808 | $GdI_3$ | $9.6 \times 10^{-3}$ | $2.0 \times 10^{-7}$ |
| Hf | XeF | 459.8 | 3000 | 169 | $HfCl_4$ | $9.1 \times 10^{-5}$ | $1.9 \times 10^{-9}$ |
| Gd | XeF | 464.4 | 2000 | 808 | $GdI_3$ | $5.3 \times 10^{-4}$ | $1.1 \times 10^{-8}$ |
| La | XeF | 469.3 | 2200 | 574 | $LaI_3$ | $8.3 \times 10^{-3}$ | $1.7 \times 10^{-7}$ |
| Re | KrF | 478.6 | 3700 | 302 | $ReI_3$ | $4.7 \times 10^{-4}$ | $9.9 \times 10^{-9}$ |
| Cr | XeF | 482.4 | 1700 | 658 | $CrBr_3$ | $2.5 \times 10^{-4}$ | $5.3 \times 10^{-9}$ |
| Tl | XeF | 487.2 | 825 | 409 | $TlCl$ | $1.0 \times 10^{-3}$ | $2.1 \times 10^{-8}$ |
| Sr | KrF | 497.7 | 825 | 863 | $SrI_2$ | $2.7 \times 10^{-5}$ | $5.7 \times 10^{-10}$ |

The values of the figure of merit, $f_m$, were calculated using pump frequencies which have been reported in the literature for the appropriate rare gas halide excimer laser (Applied Physics, 12:55; 1977).

In all the elements of Table 1, except Ti, the scattering starts from the ground state. In fact, any initial state may be used as long as it is sufficiently populated. Table 1 illustrates two important points:

1. The significant number of metals that provide wavelengths throughout the blue-green region of the spectrum.
2. The calculated gains vary over several orders of magnitude, but they are all in a range in which pump power densities of approximately $10^6$ Wcm$^{-2}$ and optical path lengths of approximately 50 cm should produce oscillation. In some instances this may require suitable resonators. In terms of threshold pump power, iron and titanium appear to be the most attractive choices for initial experiments in Raman-shifting rare gas excimer lasers to the blue-green portion of the spectrum.

While there are two methods for vapor production, thermal generation and discharge dissociation of metal halides, the preferred technique, as disclosed schematically in FIG. 1, is the electrical dissociation of a molecular vapor medium selected from a group consisting of the halide, complex halides, or oxide of a metal of interest. In this technique, a high current density discharge pulse dissociates the molecular vapor medium to produce metal atoms, free halogens or oxygen atoms. The excited metal atoms decay to the ground state, or metastable states, within approximately 10 to 100 nanoseconds, and metastable states decay to the ground state by collisional processes within 10 microseconds. The ground state metal atoms are removed by recombination with the halogen or oxygen to reform the original metal species within approximately 100 to 200 microseconds. Thus periods of several hundred microseconds exist in these discharge afterglows during which the metal ground state atoms are available to be pumped by a pulsed laser source. In addition, low-lying metal metastable species are available for periods lasting several tens of microseconds.

In addition to the elements and their halides listed in Table 1, a suitable Raman medium includes copper vapor generated from the electrical dissociation of copper halides. When pumped with the 308 nonometer output of a XeCl laser, the Raman shifting from atomic copper produces radiation at 470 nonometers. Spectroscopic measurements in copper halide vapors have disclosed copper densities of $10^{17}$ atoms per cubic centimeter and lifetimes of the copper ground state of more than 100 microseconds.

Figure 2:
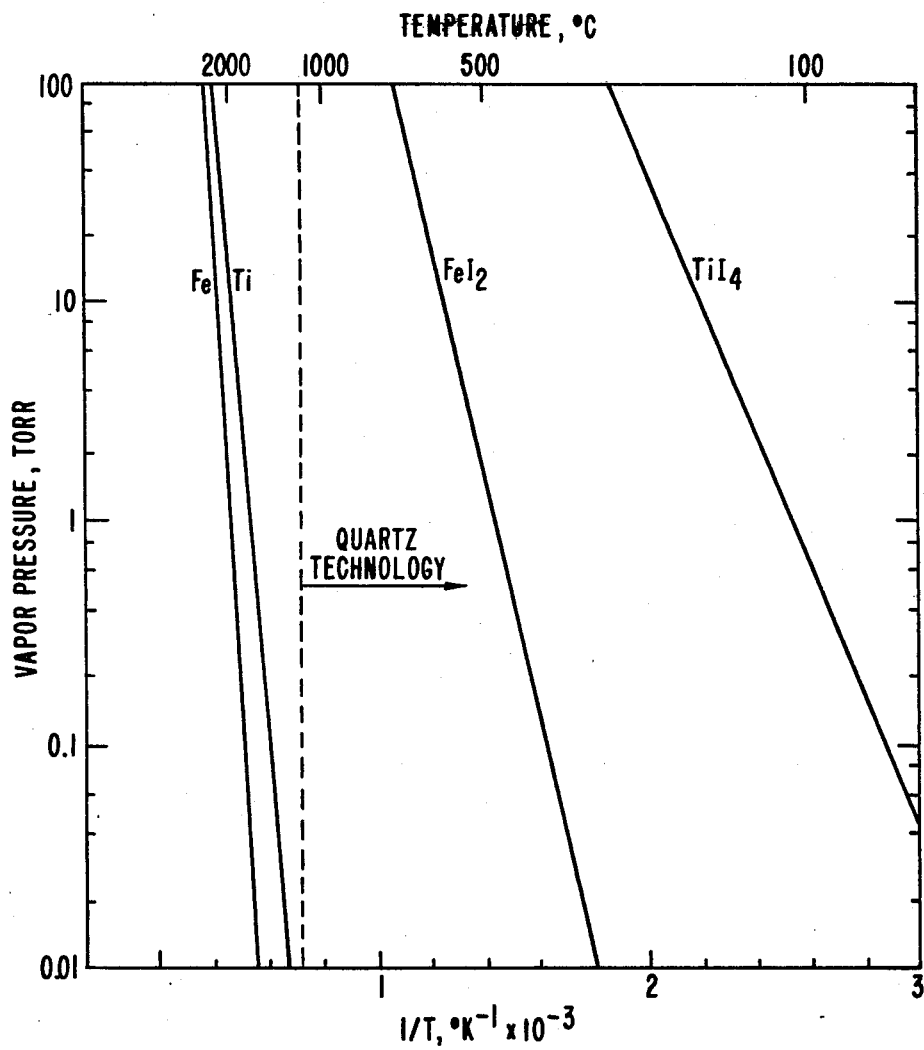
FIG. 2 is a graphical illustration of vapor pressures of metals as a function of temperature.

The vapor pressure curves of $FeI_2$ and $TiI_4$ shown in FIG. 2 demonstrate that these more volatile metal halides lie completely within the domain of standard quartz discharge tube technology for vapor pressures up to approximately one atmosphere. Vapor densities in the 1 to 10 Torr range suitable for Raman scattering applications are available with envelope temperatures below approximately 600° C. Thus quartz or even borosilicate glass discharge tube technology can be employed. In addition, the candidate Raman shifting systems listed in Table 1 include the reservoir temperatures required to produce $10^{-3}$ atmosphere (0.76 Torr) of the metal halide; it is seen that systems of interest lie within the limits of available quartz technology.

Figure 3:
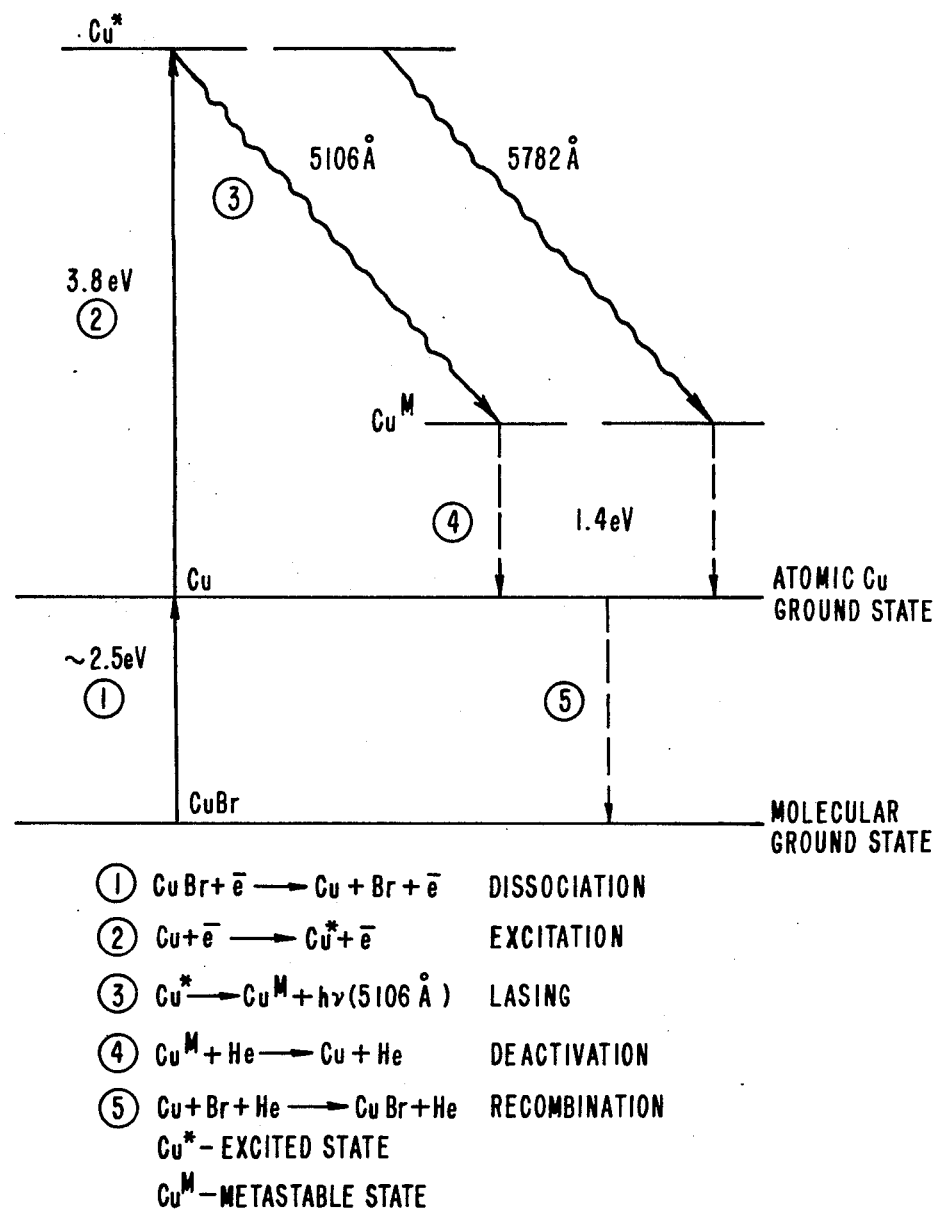
FIG. 3 is an energy diagram for a copper bromide laser system.

The simplified energy level diagram of FIG. 3 for the copper bromide laser system illustrates the various reactions which apply to Cu generation from CuBr in pulsed electrical discharges. Measurements of copper ground state and metastable densities in the afterglow of these discharges reveal that copper densities in the range of $10^{15}$ to $10^{17}$ cm$^{-3}$ can be produced during temporal periods of 10 to 100 microseconds. The same technique is broadly applicable to other metal halides, and densities in this same range are anticipated. In addition, past experience with metal halide additives to lamp discharges indicates that reversible halide chemistry and long lifetime tube operation is available with conventional all-hot quartz discharge tube designs.

Referring to FIG. 1, there is schematically illustrated a system 10 for pumping molecular vapor medium discharges with a rare gas halide excimer laser emission to produce blue-green Raman shifted emission.

The system 10 includes an all-hot quartz or Pyrex discharge tube 12 functioning as a Raman optical cell 20 which is positioned within a heating element 30. The input window 21 and the output window 23 of the cell 20 may, or may not, be at Brewster's angle. The preferred quartz tube design illustrated in FIG. 1 consists of spaced apart quartz apertured discs 13 situated along the discharge path. The discs 13 serve to stabilize the discharge and prevent tracking along the tube walls. This concept is disclosed in U.S. Pat. No. 3,934,211, assigned to the assignee of the present invention and incorporated herein by reference. The use of the apertured discs 13 is important due to the fact that the metal halides and halogens are strongly electron attaching; the metal halides are also slightly conductive. These properties tend to cause construction of the discharge, and the aperture design of the discs 13 permits uniform glow discharges to be sustained at much higher halide densities than in a smooth-bore discharge tube.

The electrodes 15, which are typically constructed from molybdenum, and the electrode feedthroughs 17 operate at the elevated tube temperature established by the heater element 30. The construction of the cell 20 utilizing a quartz tube 10 and electrodes and feedthroughs made of suitable refractory material such as molybdenum, permit the entire Raman cell 20 to be operated for extended periods, i.e., thousands of hours, at temperatures of up to 1100° C.

The tube 12 is filled with a buffer gas, typically an inert gas such as neon, at a pressure of several Torr, and a halide, complex halides, or an oxide of the metal of interest. A sufficient amount of halide or oxide is used such that at the desired operating temperature the vapor phase is in equilibrium with the solid or liquid phase. Molybdenum represents a preferred electrode material inasmuch as it is chemically compatible with the metals listed in Table 1. That is, the halides of the active metal are more stable than the halides of molybdenum.

While typical copper halide laser tubes operate at pulse rate frequencies of up to 16,000 kHz, and the electrodes are designed to operate for hundreds of hours at power loadings of approximately 5 kw, the electrode requirements in the cell 20 are much less, since the tube 12 will operate in single pulses or short bursts with a pulse or burst repetition rate compatible with present excimer laser pumps, i.e., 1 to 10 Hz. Inasmuch as the cell 20 is operated in its entirety at elevated temperatures, the windows and electrode feedthroughs are maintained at higher temperatures that the discharge region and thus no loss of vapor occurs to cold regions of the cell. In addition, the well-established chemical reversibility of the metal halide cycle assures that no loss of dissociated metal vapor occurs due to condensation on the walls of the tube 12. Thus all of the candidate metal species will operate for long lifetimes, i.e., 100 to 1000 hours, in the discharge configuration of the Raman cell 20.

The pulser circuit 40 which is connected to the electrodes 13 is typically capable of supplying 5 kV to the cell 20 at pulse repetition frequencies between 0 and 20 kHz, at voltages of up to approximately 20 kV, and pulse widths as narrow as 100 nanoseconds. In the pulser circuit embodiment, the thyratrons T1 and T2 are alternately fired such that the current polarity is reversed with each pulse. This polarity reversal at high pulse repetition frequencies prevents longitudinal cataphoresis and the consequent spatial segregation of metal and halogen species. At low pulse repetition frequencies, as may be practical for Raman applications, this current polarity reversal may not be necessary. The degree of dissociation occurring within the tube 12 is largely determined by the energy in the dissociation pulse. The timing of the pulses are controlled by the system clock SC. When a discharge current is passed through the medium M contained within the tube 12, the metal halide or oxide is dissociated into metal atoms and halogens or oxygen atoms. After a period of time, the metal atoms and the halogens or oxygen atoms recombine to reform the original halide or oxide species. In the case of copper, a significant fraction, i.e., greater than 10%, of the CuBr is dissociated, and the neutral copper atoms last for approximately 200 microseconds after the discharge ceases and before recombination occurs. Copper atom densities of $10^{17}$ cm$^{-3}$ and greater have been produced in tubes of approximately 100 cm in length at temperatures of approximately 500° C.

As typical examples, consider FeI$_3$ and ScI$_3$. In order to produce halide densities of approximately $10^{17}$ cm$^{-1}$ for FeI$_3$ and ScI$_3$, operating temperatures of 500° C. and 700° C. respectively would be required. Clearly, these temperatures are well within the operating range of a quartz tube. Atomic iron has energy levels at 39,970 cm$^{-1}$ and 17,727 cm$^{-1}$, which would produce approximately 4426 Å Raman radiation when pumped by a KrF laser at 2480 Å. Atomic scandium has energy levels at 36934 cm$^{-1}$ and 14,926 cm$^{-1}$ which would produce Raman radiation at approximately 3938 Å when pumped by a KrF laser at 2480 Å. In typical operation, the discharge would be pulsed a few microseconds before the external laser pulse is applied. It has been determined experimentally that the electrical input energy per pulse applied to the Raman cell 20 which is needed to dissociate the metal halide will be only a few Joules.

In the embodiment of FIG. 1, the external laser pulse is developed by the rare gas halide excimer laser 60 in response to pulse excitation by pulser circuit 70. The laser 60 may be typically implemented through the use of a Lumonics TE 262 laser system with a 200 mJ output at the 248 um KrF laser wavelength and a laser pulse width of approximately 15 nanoseconds. The resonator components are completely accessible, and can be modified to optimize laser output frequency stability and the wavelength. This optimization is important for obtaining the desired Raman interaction with the dissociated metal atoms of the cell 20. In addition to the above-identified commercially available laser, a laser device employing a UV-initiated, self-sustained transverse discharge in rare gas halide laser mixtures could also be employed as the laser 60. The entire laser system 60 is fluorine compatible, and can be filled with any of the rare gases together with fluorine or other fluorine-bearing molecules. In particular, laser oscillation is available at the KrF, XeCl and XeF laser wavelengths.

The operation of the pulser circuit 70 is controlled by the output of the system clock SC as applied through the delay circuit 80. Delay circuit 80 functions to delay the firing of the laser pump 60 such that the firing of the laser pump 60 occurs during the afterglow of the metal halide discharge in the Raman cell 20. The laser 60 includes a grate 62 to establish laser 60 as a grating controlled unstable resonator to provide wavelength and mode selectivity. A telescope 80, consisting of optical elements 82 and 84, reduces the beam diameter output of the laser 60 to produce pump intensities beyond the Raman threshold. While resonator mirrors 34 and 36 are shown in combination with the Raman cell 20, such mirrors are not necessary for most metals.

The laser pulse of the pumping laser 60 enters the cell 20 via the input window 21 and the resulting Raman shifted radiation emissions exit the cell 20 via the output window 23.

Although Raman conversion efficiencies are difficult to calculate, experience in molecular gases and metal vapors indicates that at pump powers exceeding two times the threshold, quantum efficiencies of approximately 40% can be achieved. Thus a Raman-shifted blue-green laser would be in the same order of efficiency as the pump laser 60. Based upon efficiencies of between 1 and 2% for rare gas halide excimer lasers, the overall efficiency of a blue-green Raman laser, such as system 10, are approximately 1%.

We claim:

1. A method of operating an all-hot Raman discharge cell to produce shifted Raman radiation from dissociated metal species, comprising the steps of:
    filling the Raman discharge cell with a molecular vapor medium selected from a group consisting of the halide, complex halides, or oxide of a metal of interest;
    pulsing said molecular vapor medium in said Raman discharge cell with an electrical discharge current to dissociate said molecular vapor medium into metal atoms, and halogens or oxygen atoms, for a predetermined afterglow period, after which period recombination occurs producing the original species of said molecular vapor medium; and
    pumping said metal atoms during said afterglow period with a laser pulse generated external to said Raman discharge cell to develop Raman interaction with the dissociated metal atoms and produce a shifted Raman radiation discharge output from said Raman discharge cell.

2. The method of claim 1 further including the step of adding an inert gas to said molecular vapor medium in said Raman discharge cell to enhance the uniformity and stability of said discharge.

3. The method of claim 1 wherein the amount of halide or oxide of said molecular vapor medium is such that the vapor phase of the medium is essentially in equilibrium with the solid or liquid phase.

4. The method of claim 1 wherein said afterglow period is in the order of several hundred microseconds.

5. The method of claim 1 further including the step of heating said cell to a temperature not to exceed approximately 1100° C.

6. The method of claim 1 wherein the pulsing of said molecular vapor medium produces densities of between about $10^{15}$ to $10^{17}$ cm$^{-3}$ of metal atoms in the afterglow period of discharges in halide or oxide combinations of the molecular vapor medium.

7. Apparatus for producing shifted Raman radiation from dissociated metal species, comprising:
    a Raman discharge cell including excitation electrodes, an input window and an output window;
    a molecular vapor medium selected from the group consisting of the halide, complex halides, or oxide of a metal of interest located in said cell;
    electrical excitation means connected to said excitation electrodes to pulse said molecular vapor medium in said Raman discharge cell with an electrical discharge current to dissociate said molecular vapor medium into metal atoms, and halogens or oxygen atoms, for a predetermined afterglow period, after which period recombination occurs producing the original species of said molecular vapor medium; and
    laser pumping means for supplying a laser pulse through said input window during said afterglow period to pump said metal atoms and develop Raman interaction with the dissociated metal atoms and produce a shifted Raman radiation discharge output from the output window of said Raman discharge cell.

8. The apparatus of claim 7 further including an inert gas mixed with said molecular vapor medium in said Raman discharge cell to enhance the uniformity and stability of the discharge.

9. The apparatus of claim 7 wherein the amount of halide or oxide of said molecular vapor medium is such that the vapor phase of the medium is essentially in equilibrium with the solid or liquid phase.

10. The apparatus of claim 7 wherein said afterglow period is in the order of several hundred microseconds.

11. The apparatus of claim 7 further including means for heating said Raman discharge cell to a temperature not to exceed approximately 1100° C.

12. The apparatus of claim 7 wherein said laser pumping means is a rare gas halide excimer laser.

13. The apparatus of claim 7 wherein said laser pumping means is selected from the group consisting of KrF, XeCl and XeF.

14. The apparatus of claim 7 further including mirrors positioned external of said input and output windows, said mirrors being resonant at the shifted Raman radiation output to resonate the radiation output from the Raman discharge cell.

15. The apparatus of claim 7 wherein said shifted Raman radiation output is in the blue-green spectral region.

16. Apparatus for producing a laser output having wavelengths in the blue-green spectral region, comprising:
    a Raman discharge cell including excitation electrodes, an input and an output window;
    a molecular vapor medium filling said Raman discharge cell, said medium selected from a group consisting of the halide, complex halides, or oxide of a metal of interest;
    means for heating said Raman discharge cell to a desired operating temperature;
    electrical excitation means connected to said excitation electrodes to pulse said molecular vapor medium with an electrical discharge current to dissociate said molecular vapor medium into metal atoms and halogens or oxygen atoms for a predetermined afterglow period, after which period recombination occurs producing the original species of said molecular vapor medium; and
    laser pumping means for supplying a laser pulse through said input window during the afterglow period to pump said metal atoms and develop Raman interaction with the dissociated metal atoms and produce a shifted Raman radiation output from said output window in the blue-green spectral region.

17. The apparatus of claim 16 wherein said laser pumping means is rare gas halide excimer laser.

* * * * *